(12) United States Patent
Elliott et al.

(10) Patent No.: US 12,059,727 B1
(45) Date of Patent: Aug. 13, 2024

(54) SYSTEMS AND METHODS FOR AUTOMATED DEPOWDERING AND TRANSFER OF ADDITIVELY MANUFACTURED OBJECTS

(71) Applicants: UT-Battelle, LLC, Oak Ridge, TN (US); NORTH CAROLINA A&T STATE UNIVERSITY, Greensboro, NC (US)

(72) Inventors: Amelia M. Elliott, Knoxville, TN (US); Sun Yi, Greensboro, NC (US); Sameer Hamoush, Greensboro, NC (US); M A Muktadir, Greensboro, NC (US); Sarita Sepulveda, Waynesville, NC (US)

(73) Assignees: UT-BATTELLE, LLC, Oakridge, TN (US); NORTH CAROLINA A&T STATE UNIVERSITY, Greensboro, NC (US)

( * ) Notice: Subject to any disclaimer, the term of this patent is extended or adjusted under 35 U.S.C. 154(b) by 0 days.

(21) Appl. No.: 18/379,829

(22) Filed: Oct. 13, 2023

Related U.S. Application Data

(60) Provisional application No. 63/528,708, filed on Jul. 25, 2023.

(51) Int. Cl.
*B22F 12/88* (2021.01)
*B22F 10/73* (2021.01)
(Continued)

(52) U.S. Cl.
CPC .............. *B22F 12/88* (2021.01); *B22F 10/73* (2021.01); *B22F 10/85* (2021.01); *B22F 12/90* (2021.01);
(Continued)

(58) Field of Classification Search
CPC .......... B22F 12/88; B22F 10/73; B22F 10/85; B22F 12/90; B22F 2998/10; B33Y 30/00; B33Y 40/00; B33Y 50/00; B33Y 50/02
See application file for complete search history.

(56) References Cited

U.S. PATENT DOCUMENTS

2018/0304360 A1* 10/2018 Fontana ................. B33Y 80/00
2021/0237159 A1* 8/2021 Go .......................... B22F 10/14
(Continued)

FOREIGN PATENT DOCUMENTS

DE 102019008281 B3 * 12/2020 ............. B24B 31/16

OTHER PUBLICATIONS

T. Yu, M. Li, A. Breaux, M. Atri, S. Obeidat, and C. Ma, "Experimental and numerical study on residual stress and geometric distortion in powder bed fusion process," Journal of Manufacturing Processes, vol. 46, pp. 214-224, 2019.
(Continued)

*Primary Examiner* — Rebecca Janssen
(74) *Attorney, Agent, or Firm* — Fox Rothschild LLP

(57) ABSTRACT

Systems and methods for additive manufacturing of objects are disclosed. The system includes an object builder subsystem configured to additively manufacture an object in a powder bed, an object extraction subsystem configured to extract the object from the powder bed, and a depowdering subsystem configured to remove powder from the object while the object is gripped by the gripper assembly. The object extraction subsystem includes a gripper assembly comprising two or more gripper members that each include a perforated mesh structure.

11 Claims, 9 Drawing Sheets

(51) Int. Cl.
  *B22F 10/85*  (2021.01)
  *B22F 12/90*  (2021.01)
  *B33Y 30/00*  (2015.01)
  *B33Y 40/00*  (2020.01)
  *B33Y 50/00*  (2015.01)
  *B33Y 50/02*  (2015.01)
(52) U.S. Cl.
  CPC .............. *B33Y 30/00* (2014.12); *B33Y 40/00* (2014.12); *B33Y 50/00* (2014.12); *B33Y 50/02* (2014.12); *B22F 2998/10* (2013.01)

(56) References Cited

U.S. PATENT DOCUMENTS

2022/0079280 A1*  3/2022  Laperriere ............... A42B 3/12
2022/0168950 A1   6/2022  Yu et al.

OTHER PUBLICATIONS

R. Jiang, A. Mostafaei, J. Pauza, C. Kantzos, and A. D. Rollett, "Varied heat treatments and properties of laser powder bed printed Inconel 718," Materials Science and Engineering: A, vol. 755, pp. 170-180, 2019.

A. Mostafaei, J. Toman, E. L. Stevens, E. T. Hughes, Y. L. Krimer, and M. Chmielus, "Microstructural evolution and mechanical properties of differently heat-treated binder jet printed samples from gas-and water-atomized alloy 625 powders," Acta Materialia, vol. 124, pp. 280-289, 2017.

P. Nandwana, A. M. Elliott, D. Siddel, A. Merriman, W. H. Peter, and S. S. Babu, "Powder bed binder jet 3D printing of Inconel 718: Densification, microstructural evolution and challenges?," Current Opinion in Solid State and Materials Science, vol. 21, No. 4, pp. 207-218, 2017.

J. Moon, J. E. Grau, V. Knezevic, M. J. Cima, and E. M. Sachs, "Ink?jet printing of binders for ceramic components," Journal of the American Ceramic Society, vol. 85, No. 4, pp. 755-762, 2002.

M. Lanzetta and E. Sachs, "Improved surface finish in 3D printing using bimodal powder distribution," Rapid Prototyping Journal, 2003.

D. Tancred, B. McCormack, and A. Carr, "A synthetic bone implant macroscopically identical to cancellous bone," Biomaterials, vol. 19, No. 24, pp. 2303-2311, 1998.

S. C. Cox, J. A. Thornby, G. J. Gibbons, M. A. Williams, and K. K. Mallick, "3D printing of porous hydroxyapatite scaffolds intended for use in bone tissue engineering applications," Materials Science and Engineering: C, vol. 47, pp. 237-247, 2015.

https://markforged.com/3d-printers#:~:text=Washed%20%E2%80%9Cbrown%E2%80%9D%20parts%20are%20placed%20in%20a%20Markforged,remove%20the%20remaining%20binder%20and%20solidify%20metal%20powder.

ExOne Production Metal 3D Printing 4.0 Vision. 210309_x1_handout_automated_desanding_station_en_2021-02_www.pdf (exone.com) <https://www.exone.com/getattachment/7eb6d5bf-2cf8-427e-8d3f-05738e629cb5/210309_x1_handout_automated_desanding_station_en_2021-02_www.pdf>.

* cited by examiner

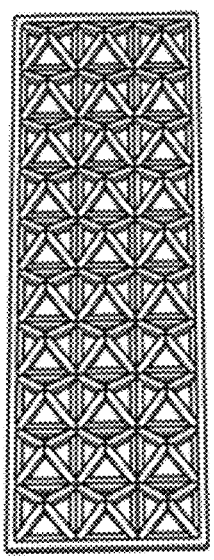
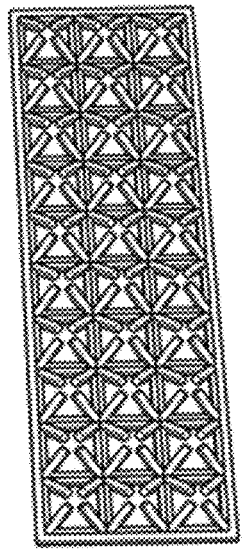
FIG. 5A  FIG. 5B
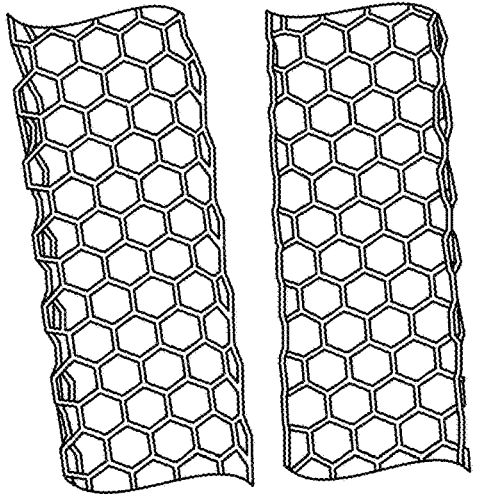
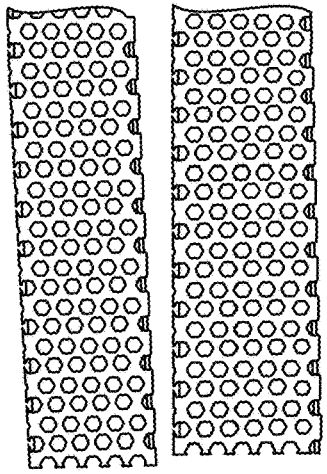
FIG. 5C  FIG. 5D
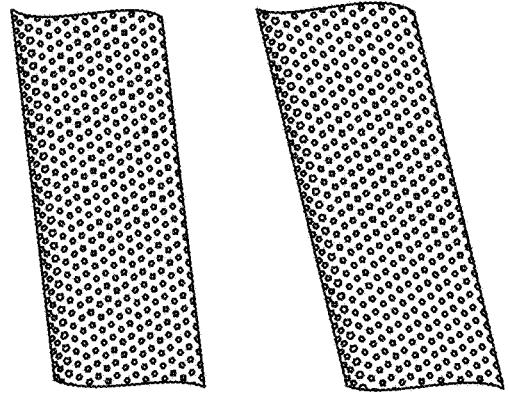
FIG. 5E

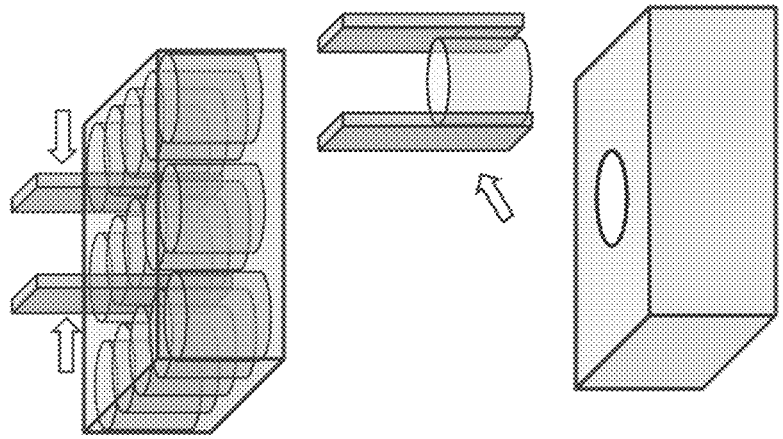
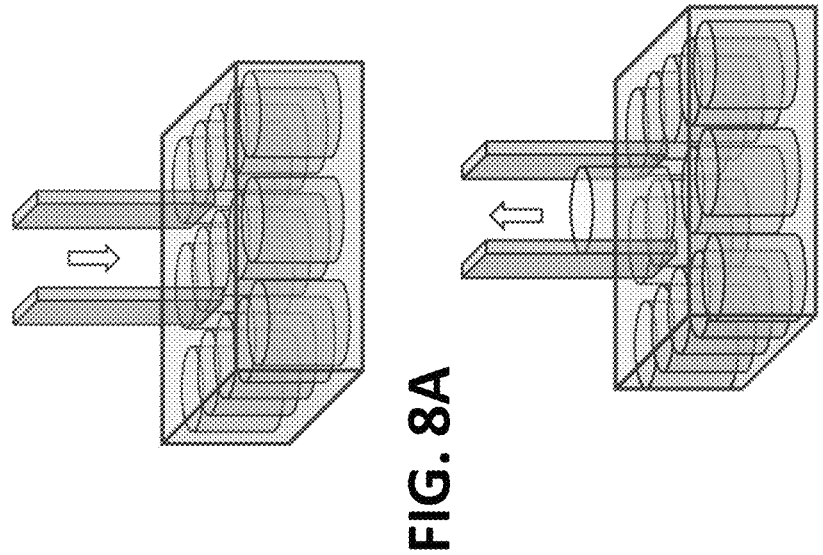
FIG. 8A  FIG. 8B  FIG. 8C  FIG. 8D

SYSTEMS AND METHODS FOR AUTOMATED DEPOWDERING AND TRANSFER OF ADDITIVELY MANUFACTURED OBJECTS

PRIORITY

This application claims priority to U.S. Provisional Appl. No. 63/528,708 filed on Jul. 25, 2023, the disclosure of which is incorporated herein by reference in its entirety.

STATEMENT REGARDING FEDERALLY SPONSORED RESEARCH AND DEVELOPMENT

This invention was made with government support under Contract No. DE-AC05-00OR22725 awarded by the United States Department of Energy. The government has certain rights in this invention.

TECHNICAL FIELD

This application relates to post-processing of additively manufactured objects and, more particularly, to depowdering of additively manufactured objects.

BACKGROUND

Powder-based additive manufacturing includes use of powder as the medium for building the object of manufacture. Powder-based additive manufacturing can be used with various powdered materials and its flexibility allows for geometrically complex three-dimensional structures. As with other additive manufacturing processes, the object is first modeled with data, and then computerized equipment then builds the object layer-by-layer. In a powder-based process, the layers are formed by sintering, bonding, or otherwise fusing powder granules.

A characteristic of powder-based additive manufacturing is that that the object is made inside a "build box" containing the powder. The object must be removed from the build box once it is formed, and the powder must be removed from the object. Conventionally, this removal process involves manually removing the build box from the additive manufacturing system, removing the object, then manually separating the powder from the object. This process is called depowdering. Problems with conventional removal processes include but are not limited to wasted powder material, damage to delicate parts of the manufactured object, jamming of manufacturing machine parts from powder, extensive labor expenses, and safety hazards from exposure to loose powder.

This document describes methods and systems that are directed to addressing the problems described above, and/or other issues.

SUMMARY

In various scenarios, systems and methods for additive manufacturing of objects are disclosed. In various embodiments, the system may include an object builder subsystem configured to additively manufacture an object in a powder bed, an object extraction subsystem configured to extract the object from the powder bed, and a depowdering subsystem configured to remove powder from the object while the object is gripped by the gripper assembly. The object extraction subsystem includes a gripper assembly comprising two or more gripper members that each include a perforated mesh structure. Optionally, the perforated mesh structure may include a plurality of openings configured an open-Kagome lattice or a closed-Kagome lattice.

In some implementations, the system may also include a processor and a computer readable medium comprising one or more programming instructions. The instructions may be executed by the processor to, for example, determine a location of the object within the powder bed, and transmit the location to the object extraction subsystem. Optionally, the processor may determine the location of the object based on, for example, sensor data, user input, and/or an object model used for additively manufacture of the object. Optionally, the processor may also determine a size of the object.

In some implementations, the system may also include a robotic arm configured to position the gripper assembly over the powder based on the location.

Optionally, the perforated mesh structure may include a plurality of openings that are configured to allow powder from the powder bed to flow therethrough during one or more steps of extracting the object from the powder bed.

In various embodiments, the gripper members may include one or more sensors that are configured to detect contact between that gripper member and the object and not detect contact between that gripper member and powder particles in the powder bed. Optionally, the two or more gripper members may be configured to grip the object by moving from an open position to a grip position upon detection of contact with the object.

Optionally, the perforated mesh structure may include a compliant surface that is configured to be compliant in a grip direction of the grip assembly. Additionally and/or alternatively, the perforated mesh structure may include a rigid backbone that is configured to be rigid along a plunge direction in which the grip assembly will enter the powder bed for extraction of the object.

In various embodiments, the depowdering subsystem may include a nozzle configured to direct a fluid stream at the object while gripped by the gripper assembly such that the fluid stream can pass through openings of the perforated mesh structure of the two or more gripper members to remove powder from the object.

In various embodiments, the methods may include, by a processor causing an object builder subsystem to additively manufacture an object in a powder bed, causing a gripper assembly to extract the object from the powder bed, and causing the gripper assembly to transfer the extracted object to a depowdering subsystem for removing powder from the object while the object is gripped by the gripper assembly. The gripper assembly may include two or more gripper members that each include a perforated mesh structure.

In various implementations, the methods may also include determining a location of the object within the powder bed and transmitting the location to the gripper assembly. Optionally, the location may be determined based on, for example, sensor data, user input, and/or an object model used for additively manufacture of the object. The methods may also include determining a size of the object. Optionally, the methods may include causing a robotic arm to position the gripper assembly over the powder based on the location.

In some embodiments, the methods may include detecting contact between a gripper member and the object while discarding contact between that gripper member and powder particles in the powder bed based on a sensor included in the gripper member. Optionally, the processor may cause the two or more gripper members to grip the object by moving from an open position to a grip position upon detection of contact with the object.

In various embodiments, the processor may cause a nozzle of the depowdering system to direct a fluid stream at the object while gripped by the gripper assembly such that the fluid stream can pass through openings of the perforated mesh structure of the two or more gripper members to remove powder from the object.

In some scenarios, a system for additive manufacturing of objects can include an object extraction subsystem and a depowdering subsystem. The object extraction subsystem may be configured to extract an object additively manufactured in a powder bed. The object extraction subsystem can include a robotic arm coupled to a gripper assembly comprising two or more gripper members that each include a perforated mesh structure comprising a plurality of openings that are arranged and configured to allow powder to flow through. The robotic arm is configured to transfer the object to a remotely located depowdering system while the object is being held by the gripper assembly. The depowdering subsystem may be configured to remove powder from the object while the object is gripped by the gripper assembly. The depowdering subsystem can include a nozzle configured to direct a fluid stream at the object while gripped by the gripper assembly such that the fluid stream can pass through openings of the perforated mesh structure of the two or more gripper members to remove powder from the object. Optionally, the system can include a processor and a non-transitory computer readable medium comprising one or more programming instructions. The processor can execute the programming instructions to determine a location and a size of the object within the powder bed, transmit the location and the size to the object extraction subsystem, cause the robotic arm of the object extraction subsystem to move the gripper assembly to the location, cause the gripper assembly of the object extraction subsystem to, based on the size, grip the object at the location, cause the robotic arm to move the object, while being gripped by the gripper assembly, to the depowdering subsystem.

Optionally, the gripper members are configured to grip the object by moving from an open position to a grip position upon detection of contact with the object where the open position the determined based on the size of the object.

In various embodiments, the perforated mesh structure can include a compliant surface that is configured to be compliant in a grip direction of the grip assembly. The compliant surface is configured to prevent damage to the object while being gripped by the gripper assembly. Optionally, the perforated mesh structure further comprises a rigid backbone that is configured to be rigid along a plunge direction where the plunge direction is a direction in which the grip assembly will enter the powder bed for extraction of the object.

BRIEF DESCRIPTION OF THE DRAWINGS

FIGS. 3A-3D illustrate an example schematic of object extraction from a powder bed that allows for powder to trickle through openings in gripper members.

FIGS. 5A-5E illustrate various example mesh structure with openings for forming gripper members.

FIGS. 8A-8D illustrate schematic representations of steps of an object being extracted from a powder bed.

DETAILED DESCRIPTION

Figure 1:
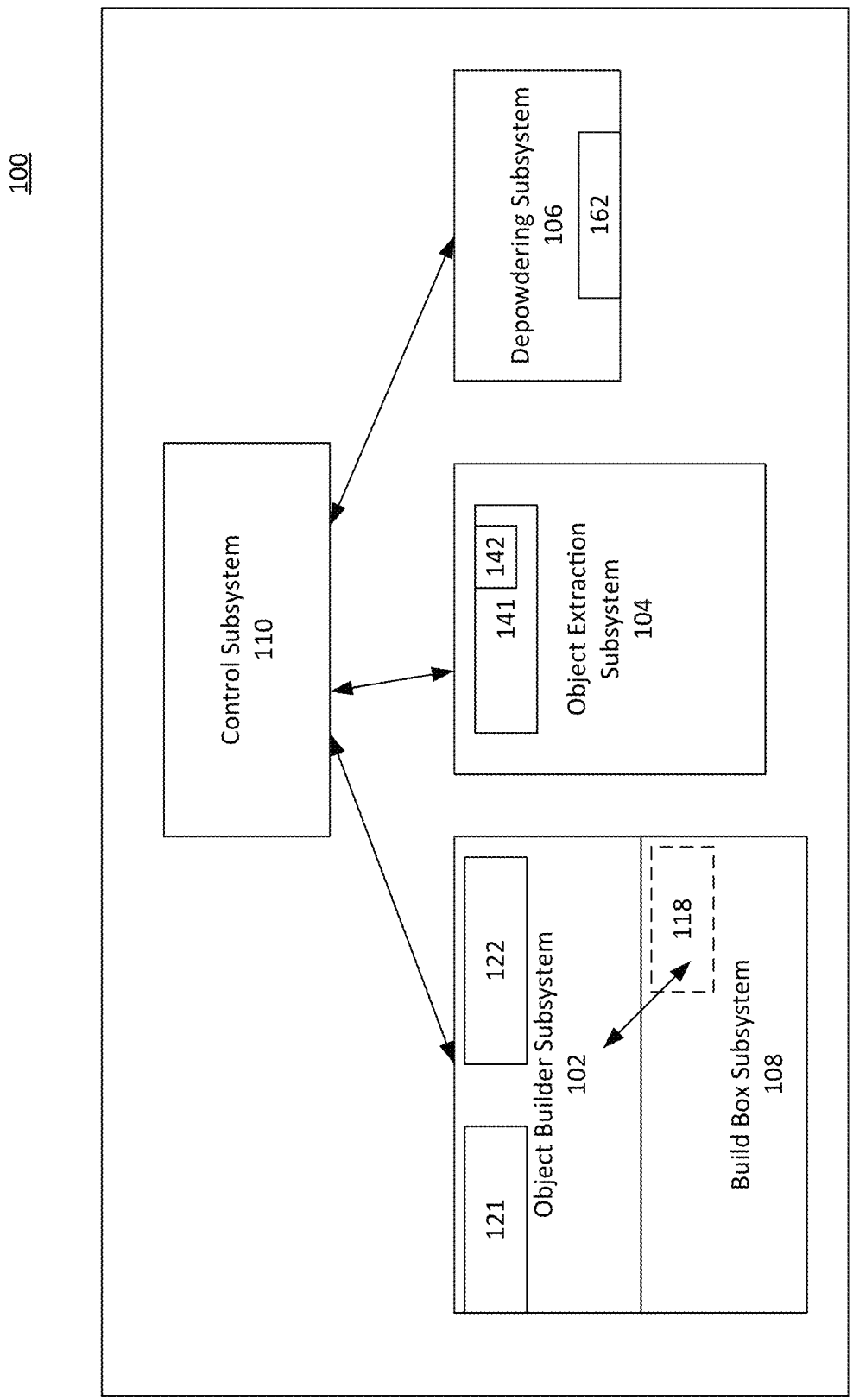
FIG. 1 illustrates a schematic of an example additive manufacturing system in accordance with this disclosure.
Figure 2:
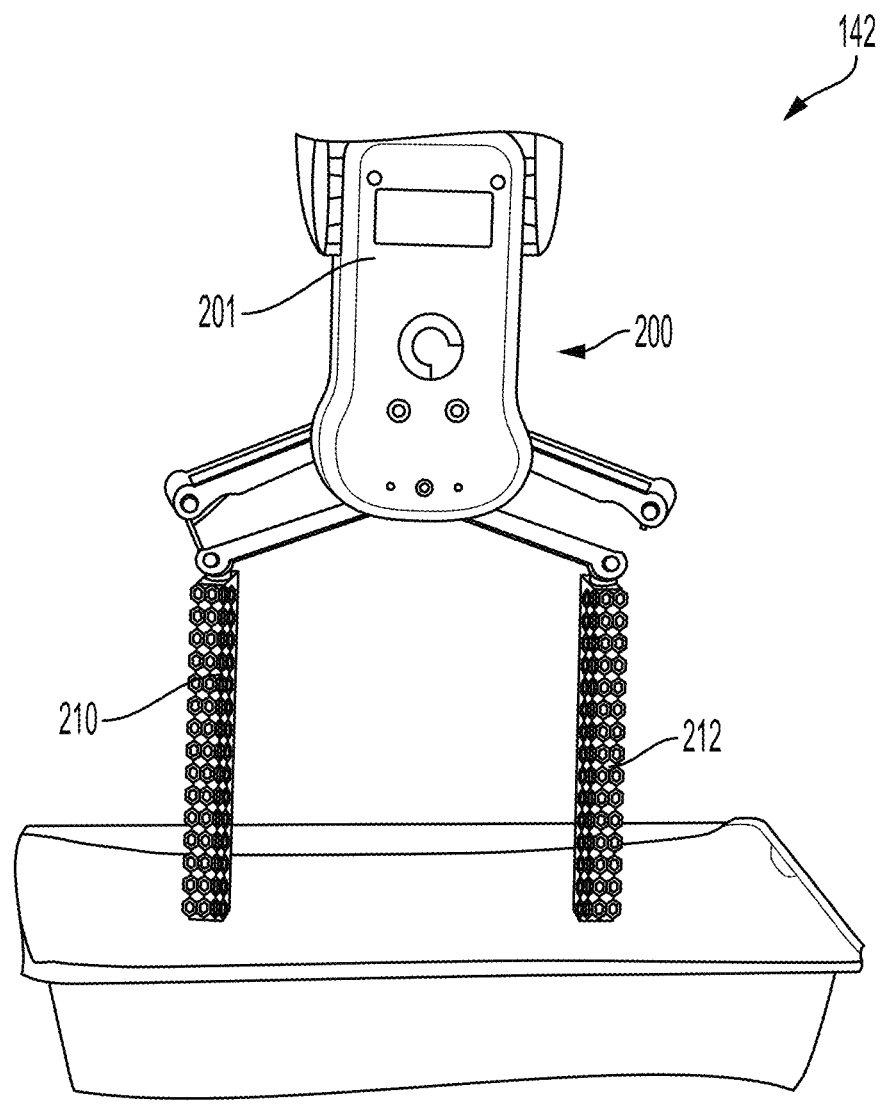
FIG. 2 illustrates an example gripper assembly.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to." Definitions for additional terms that are relevant to this document are included at the end of this Detailed Description.

In some kinds of additive manufacturing processes solid objects are manufactured using a computer-controlled beam or print head to fuse or solidify portions (such as the walls) of the object a layer at a time until the entire three-dimensional object is formed. Examples of the additive manufacturing process can include, without limitation, Selective Laser Sintering (SLS), Electron Beam Melting (EBM), Multi-Jet Fusion (MJF), Direct Metal Laser Sintering (DMLS), Selective Laser Melting (SLM), Powder Bed Fusion (PBF), or Binder Jet Printing (BJP), or the like. After the solid three-dimensional (3D) object is formed, unwanted material, such as a powder from which the object was formed, may cling to or encase the solid object. It is necessary to remove this unwanted material from the solid manufactured object before the next step, which may include painting, curing, passivation, coating, assembly, and so on. Removal of unwanted powder material from additively manufactured parts (or objects) is sometimes referred to as decaking or depowdering. A block of build material containing a 3D object may therefore be alternately referred to herein as a "powder bed", a "powder cake", a "build cake", a "powdered build cake", and the like.

The strength or firmness of the powder surrounding the 3D object can depend on various factors associated with the particular manufacturing process used to generate the cake. Such factors can include, for example, the type of powdered build material used, the amount of preheat applied to the layers of build material, the amount of heat applied to melt selected regions of build material layers, and so on. Thus, in different examples, in addition to a fully fused and solidified 3D object, the cake may comprise a continuum of build material that ranges in firmness from loosely bound powder to weakly fused powder. In some examples, the cake may comprise more firmly fused powder in areas closer to the 3D object that have been exposed to higher levels of heat during manufacturing.

Accordingly, after a manufacturing process is completed, extracting 3D objects from the heated powder bed can involve a number of post manufacturing steps. For example, an initial post manufacturing step can include sifting through the powder to search for and extract the objects. If the cake comprises loosely bound powder, extracting a 3D object can include digging into the loose powder and carefully removing the object by hand. Other post manufacturing steps can include cleaning the 3D objects using pressurized air to remove the remaining fine powder, polishing surfaces of the objects, applying a coating to the surfaces of the objects, and so on.

These and other post manufacturing processes can involve significant human interaction with the powder bed. For example, the loose powder may need to be physically and manually removed from the 3D manufacturing device and relocated to a setting that is conducive to applying mechanisms to the fused cake that can cause the cake to break apart. Optionally, the 3D object may first need to be dug out of layers of powder by a person manually sifting through the powder. Further, depowdering mechanisms have generally included various types of hand held instruments such as hammers, trowels, brushes, and so on. Such post manufacturing processes can add significant time, labor, and cost to the creation of 3D manufactured parts or objects. Moreover, using such conventional processed, copious amounts of powder are lifted out of the powder bed with moving air where often the powder is hazardous (e.g., explosive), may get caught in various system components leading to malfunction and system failure (e.g., in filters, moving parts, etc.), requires cleaning of processing chambers, and expensive compressed air.

Accordingly, this disclosure describes systems and methods that enable automated extraction of 3D objects from powdered build cakes created in 3D manufacturing devices. The system for extracting a 3D object enables automation of various extraction steps that can significantly reduce the time and effort involved in extracting 3D objects from powder cakes. Furthermore, the automated extraction enables depowdering of the manufactured part outside of the powder bed in order to overcome some of the issues discussed above (e.g., jamming of machine parts from blowing of powder).

Irrespective of how parts or objects are formed from a powder or other granular material, subsequent to the additive fabrication process these parts are accessed by separating the parts from the material. This process of retrieving parts from a granular material in which the parts are formed is referred to herein as "depowdering," although it will be appreciated that techniques described herein are not limited to use cases in which the additional material comprises or consists of a powder. As such, while the discussion below may focus primarily on separating parts from a powder, it will be appreciated that any discussion of depowdering may also apply to separating additively fabricated parts from other granular materials.

FIG. 1 shows an example additive manufacturing system 100, in accordance with this disclosure. The additive manufacturing system 100 may comprise an object builder subsystem 102, an object extraction subsystem 104, a depowdering subsystem 106, a build box subsystem 108, and a control subsystem 110. The control subsystem 110 may communicate with the object builder subsystem 102, the object extraction subsystem 104, the depowdering subsystem 106 and/or the build box subsystem 108 through, for example, a wired or wireless network architecture (not shown). As generally described herein, a subsystem refers to a collection of software or hardware modules (or a combination thereof), within the system 100; and that performs a particular function. It should be noted that while the different subsystems are shown as being separate from each other, one or more of the subsystems may together form a single subsystem without deviating from the principles of this disclosure.

The control subsystem 110 may monitor, coordinate and supervise the fabrication of the object(s) within the object builder subsystem 102, removal of the object via the object extraction subsystem, and depowdering of the object. Similarly, the control subsystem may control other functions of the system 100. Further, the wired or wireless network architecture (not shown) may facilitate communication between any of the subsystems within the additive manufacturing system 100. For example, the control subsystem 110 may actuate and control the object extraction subsystem 104 (or components thereof) to extract the object from the powder bed upon determining that an object manufacturing step is complete. The control subsystem may, optionally, determine the location of the manufactured object (as discussed below) and control the object extraction subsystem accordingly. Similarly, the control subsystem 110 may actuate and control the depowdering subsystem 106 upon determining that an object has been extracted and moved to a depowdering position.

As shown in FIG. 1, the build box subsystem 108 may be associated (mechanically, electrically, or both) with the object builder subsystem 102 to provide a powder bed 118. As referred to herein, a "build box" includes any structure in which parts or objects may be fabricated within a powder by an additive fabrication device, and that may be removed from the additive fabrication device subsequent to fabrication. Optionally, the build box may be included within the object builder subsystem.

The object builder subsystem 102 may be any now or hereafter known additive manufacturing system such as, without limitation, SLS, EBM, MJF, DMLS, SLM, PBF, BJP, or the like. The object builder subsystem 102 may include one or more spreaders 121 (e.g., hoppers, rollers, blades, etc.) movable across the powder bed to spread a layer of build material such as powder (e.g., from a powder supply). For example, layers of powder may be applied to the powder bed by a hopper followed by a compaction roller. The hopper moves across the powder bed, depositing powder along the way. The compaction roller follows the hopper, spreading the deposited powder to form a uniform layer of powder. In some examples, the build material may be a powder-like granular material, which may for example be a plastic, ceramic or metal powder. The properties of generated objects may depend on the type of build material and the type of solidification mechanism used.

In some examples, selective solidification is achieved through directional application of energy, for example using a laser or electron beam which results in solidification of build material where the directional energy is applied. In other examples, at least one print agent may be selectively applied to the build material, and may be liquid when applied. For example, a 'coalescence agent' or 'coalescing agent' (for example, a fusing agent in examples where the build material comprises a plastics powder, or a binder agent in examples where the build material comprises a metal powder) may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat) is applied to the layer, the plastic build material coalesces and solidifies to form a slice of the three-dimensional object in accordance with the pattern. The binder agent may have a composition that, when heated or when UV energy is applied, causes the metal particles of build material to which binder agent is applied to adhere to one another. In other examples, coalescence may be achieved in some other manner.

An energy/material source 122 may, therefore, be provided within the object builder subsystem 102 and configured for jetting, for example, a material (e.g., a binder for BJP), energy (e.g., energy from a laser/electron beam for SLS/SLM/PBF/etc.), or combinations thereof, for formation of a desired 3D object from the powder on the powder bed. The energy/material source 122 may include a print head, a beam head, a laser head, or other suitable structure and may be suitably actuated, positioned, and otherwise controlled based on a model of the object being built (e.g., computer-aided-design (CAD) model) to deposit, layer by layer, the desired 3D object in precise geometrical shapes (e.g., by fusing the powder, binding the powder, or the like).

In operation, a controller 123 of the object builder subsystem 102 may actuate the energy/material source 122 to deliver the coalescing agent (e.g., a binder material0 and/or energy to each layer of the powder in a controlled two-dimensional (or even 3D) pattern, as the energy/material source 122 moves across the powder bed 118. In embodiments, the movement of the energy/material source 122, and its actuation to deliver the coalescing agent and/or energy may be coordinated with movement of the spreader 121 across the powder bed 118. For example, the spreader may spread a layer of the powder across the powder bed, and the material/energy source may deliver the coalescing agent and/or energy in a controlled, two-dimensional pattern, to the layer of the powder spread across the powder bed, to form a layer of at least one 3D object. These steps may be repeated (e.g., with controlled two-dimensional pattern for each respective layer) in sequence to form subsequent layers until, ultimately, one or more 3D objects (each having a desired geometry based on a corresponding object model) are formed in the powder bed 118. The powder bed 118 may, optionally, comprise nested layers that each include one or more objects.

The build box subsystem 108 may include an actuator that lowers the powder bed 118 incrementally as each layer of powder is distributed across the powder bed 118. In some embodiments, separating plates may be disposed upon the powder bed 118 as an object or objects are completed, so that a subsequent powder bed layer may be manufactured, thereby forming two or more nested layers of object(s) within the powder bed 118.

The object extraction subsystem 104 may comprise a robotic arm configured to excavate and remove an object from the powder bed. In some examples, the robotic arm of the object extraction subsystem 104 may be specialized to move 3D objects within the system 100 to desired locations (e.g., to a depowdering location, to a postprocessing subsystem etc.). For instance, the object extraction subsystem 104 may include specialized hardware (as discussed below) and/or software (e.g., customized code for a particular operation or set of operations). In various embodiments, the object extraction subsystem 104 may comprise a robotic arm 141 including and/or coupled with a configurable or articulatable item-engaging tool 142 or other manipulator, the robotic arm and/or the item-engaging tool having multiple degrees of freedom and capable of a wide range of motion. For example, the robotic arm may effect translation of item-engaging tool through a three-dimensional space and rotation of the gripper assembly around a vertical rotation axis. Numerous different item-engaging tools are available depending on the specific tasks to be performed. In some embodiments, the object extraction subsystem 104 may additionally or alternatively comprise a conveyor belt, rollers, or other mechanisms to move items from one location and/or orientation to another.

As discussed, the control subsystem 110 may be configured to move the robotic arm to a location of the object, picks up the object by controlling the item-engaging tool, move the robotic arm to at least one successive position and release the object by controlling the item-engaging tool. For example, the robotic arm and/or the item-engaging tool may be configured to move a gripped object suitable position (e.g., by translation and/or rotation) with respect to the depowdering subsystem for subsequent depowdering operations. Furthermore, the robotic arm and/or the item-engaging tool may be configured to position and/or release the depowdered object at a desired location (e.g., a location for postprocessing such as sintering).

In various embodiments, the item-engaging tool 142 of the robotic arm may include a gripper assembly (e.g., gripper assembly 200) also referred to as "gripper". The gripper assembly 200 includes two or more (e.g., 2, 3, 4, etc.) gripping members 210, 212 operable to grab an object via an actuation mechanism included in the gripper body 201 (e.g., a lever assembly, a gear assembly, a piston assembly, or the like). In typical configurations, the gripper member(s) together effect a pick-up mechanism for picking and placing an article. The mechanism may be one of many kinds of tools known to those skilled in the art such as, for example, a magnetic mechanism, a vacuum or suction assisted mechanism, a mechanical mechanism (e.g., friction), or the like depending on the characteristics of the article to be picked and placed. Once the gripper has picked up the object(s), the gripper assembly may further be configured to move the gripped object(s) into the desired position and/or release it.

In some embodiments, a sensor array (not shown here) may be placed on the inside, outside, or both inside and outside of a gripping member depending on the gripper's function. The sensor array may be configured to detect that the gripper members have made contact with a manufactured object and differentiate gripper member contact with powder around the object. Upon detection of contact with an object, the gripper member(s) may be actuated (e.g., moved from an open position to a gripping position) to grip the object and remove the object from the powder bed (e.g., by lifting up the object from the powder bed). For example, the sensor array may pressure sensitive sensors which when in contact with an object (and not powder) will deform and output voltage signals. Specifically, pressure sensitive sensors are configured such that the pressure applied by powder is not enough to deform the pressure sensitive sensor and output voltage signals.

For those grippers meant to grasp the outside of an object, the sensor arrays may be placed on the inside of the gripping members. For those grippers meant to grasp an object from the inside, for example grabbing a container or bottle from the inside, the sensor arrays may be placed on the outside of the gripping members.

Figure 3D:
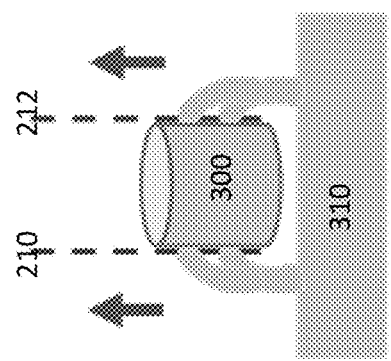
Figure 3D:
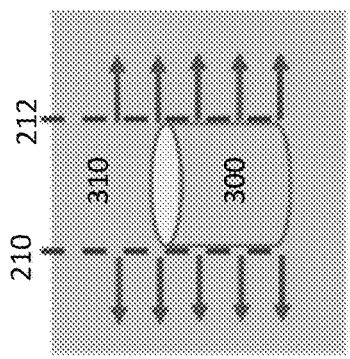
Figure 3B:
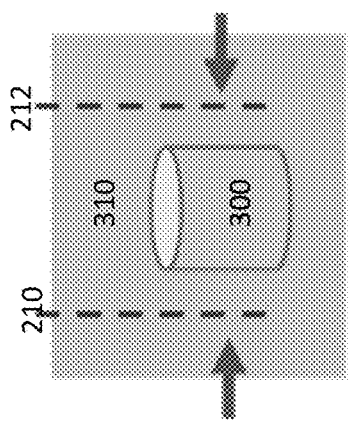
Figure 3A:
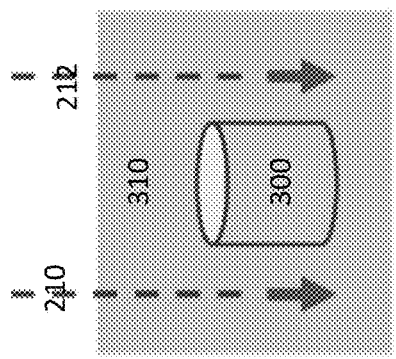

In various embodiments, the gripper members may be configured to sieve through the powder on the powder bed to reach and grab the object(s) without causing damage to the object. Further, the sieving action allows for the gripper to reach the part without prematurely triggering the sensor array due to contact with the powder (e.g., pressure from the powder granules on pressure sensitive sensors) as the gripper moves through the powder bed. As such, the gripper members may include a perforated mesh structure comprising a plurality of openings or holes (for example in the form of a grid, a sieve, or other perforated structure). As shown in FIG. 3A, the openings in the gripper member(s) 210 and 212 allow for powder from the powder bed 318 to trickle outwards when the gripper member(s) 210 and 212 plunge in the powder bed 318 surrounding the object 300. For example, the mesh openings allow powder to trickle through thereby reducing resistance to movement of the gripper member(s) within the powder bed. The openings in the gripper member(s) 210 and 212 also allow for powder to sieve through the fingers when the gripper member(s) are actuated to move into the gripping position (FIG. 3C) from an open position (FIG. 3B), when the gripper member(s) grabs an object (FIG. 3C—as shown by the arrows), and/or when the object is moved (e.g., by lifting—as shown by the arrows) from powder bed (FIG. 3D). Such a mesh structure provides an improvement over prior art grippers that do not reduce resistance to gripping caused by powder and/or may cause slippage of the object from the gripper member(s) during retrieval and depowdering because of the powder remaining trapped between the gripper member(s) and the object. Further, as previously mentioned, the mesh structure reduces the resistance to drag when the gripper is moving through the powder toward the part during gripping, so the sensors can detect whether the part is gripped even when the powder bed resistance is being detected.

Figure 4A:
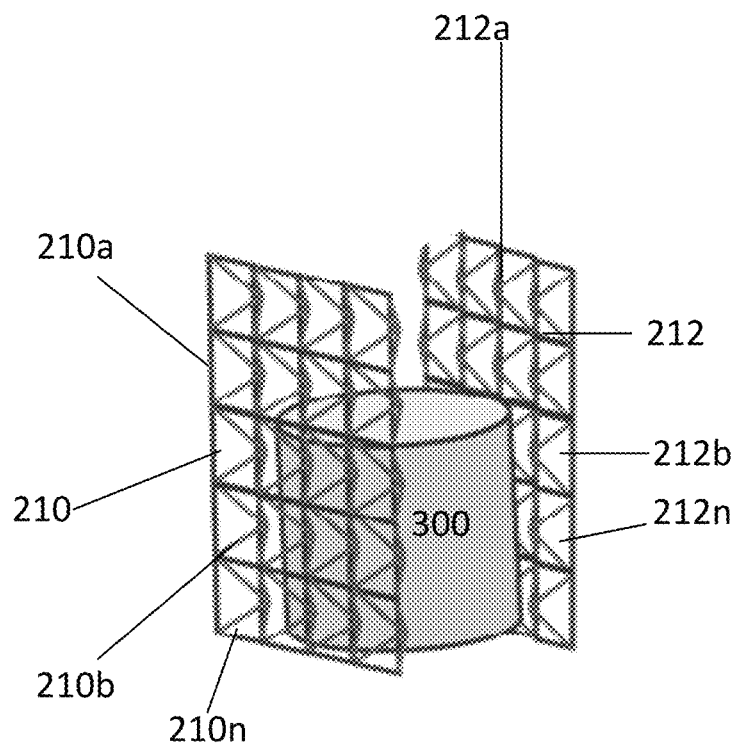
FIG. 4A illustrates an example object being gripped by gripper assembly.
Figure 4B:
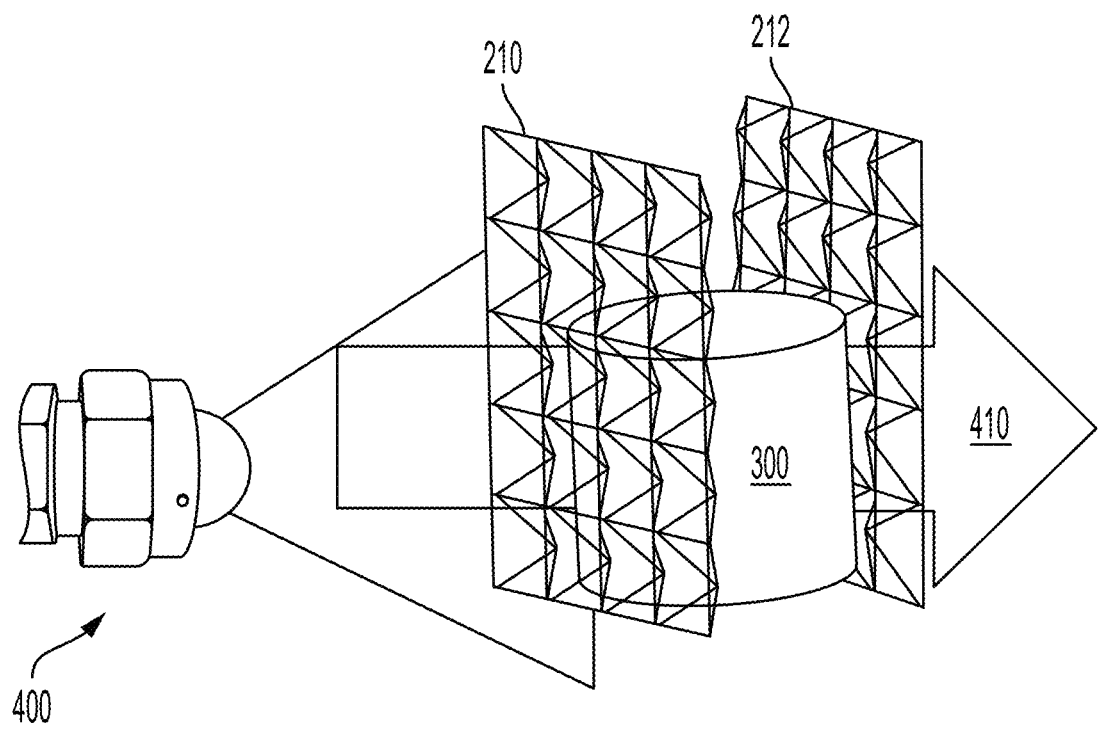
FIG. 4B illustrates a depowdering operation.

An example of gripper members 210 and 212 with mesh openings (210a-n and 212a-n) gripping an object is shown in FIG. 4A. The openings 210a-n and 212a-n of the mesh structure are also configured to allow for depowdering of an object while being held by the gripper member(s) 210 and 212. Specifically, as shown in FIG. 4B, air and loose powder may easily flow through (as indicated by the arrow 410) the openings enabling depowdering of the object using an air wash (e.g., by subjecting the gripper object to pressurized air from, for example, a nozzle 410).

In various embodiments, the gripper members may include a mesh having openings arranged in the form of a lattice such as a Kagome lattice structure (open as shown in FIG. 5A or closed as shown in FIG. 5B). Other mesh structures are within the scope of this structure such as those shown in FIGS. 5C, 5D, and 5E.

Figure 6:
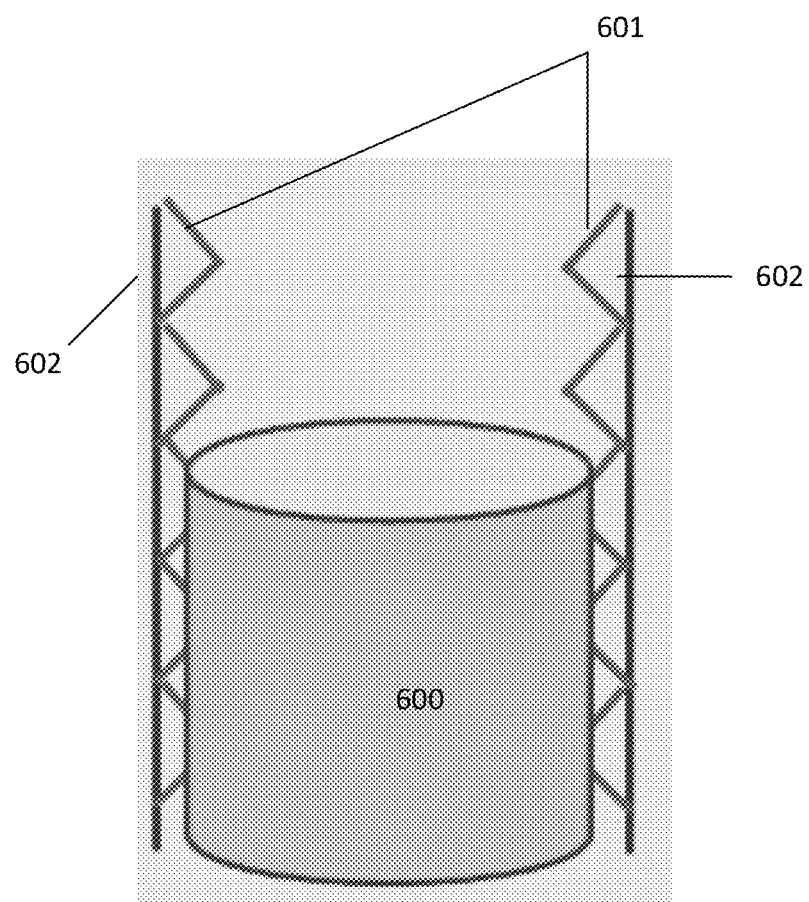
FIG. 6 illustrates example gripper members including a backbone and a compliant surface.

Optionally, the gripper member(s) may include a complaint surface attached to a rigid backbone. As shown in FIG. 6, the compliant surface (601) may be provided in the grip direction to avoid damaging the object being grabbed while the rigid backbone (602) (e.g., along a plunge direction) helps maintain a reliable grip on the object (600) during removal. The compliant surface may be provided using, for example, a perforated padding that also includes openings to allow for flow of powder through the gripper member(s). Examples of the compliant surface may include, without limitation, extruded grids, 3D printed lattices made from elastomers or compliant materials, open-cell foam, or any structure that allow powder to flow freely through it. Similarly, the rigid backbone may also include openings (e.g., the mesh opening arrangements/structures shown in FIGS. 5A-5E)

In various embodiments, the shape, size, number, mesh opening arrangements, material, arrangement, and/or other features of the gripper members may be determined based on, for example and without limitation, the shape, size, weight, spacing between parts/objects, number, or the like of the objects to be removed from the powder bed at a given time, and the properties of the powder such as flowability, particle size, and others. For example, the gripping member(s) may have a curved profile for picking up cylindrical objects and a planar profile for picking up cuboid objects. In another example, the mesh structure and material may depend on the weight of the object and the required rigidity for picking up the object (more rigid for heavier objects). In yet another example, the number of gripping member(s) may depend upon the shape of the object (e.g., at least 3 for curved objects and at least 2 for planar objects). It should be noted that the gripper assembly may be configured to simultaneously pick more than one object at a time.

Referring back to FIG. 1, the depowdering subsystem 106 may be configured to remove powder particles attached to an object removed from the powder bed and while being gripped by an item-engaging tool of the robotic arm. For example, depowdering subsystem 106 may be configured to remove powder particles attached to an object during transfer, via the robotic arm, from the powder bed to a post processing location. In other words, the object may be conveyed the depowdering subsystem may remove powder from an object when the object is moved past the depowdering subsystem by the robotic arm.

The de-powdering subsystem 106 may include at least one pressurized fluid applicator 162 (e.g., a pressurized nozzle as shown in FIG. 4) which is configured to direct a fluid jet (for example an air jet) in order to agitate and/or remove powder from the object. Optionally, the pressurized fluid applicator may comprise one or more of nozzles for delivering jets of air (or other fluid) at a desired pressure to remove all or substantially all of the unbound powder. The pressurized fluid applicator may alternatively deliver an abrasive material or other type material (e.g., water or solvent) to assist in the de-powdering operation, similar to the functioning of a sand blaster.

According to some embodiments, the depowdering subsystem may also include one or more sources of suction, such as vacuums configured to withdraw the agitated unbound powder. The nozzle(s) (e.g., 162) may dislodge, aerate and/or otherwise increase the flowability of regions of the powder, thereby improving the ability of the source(s) of suction to remove powder from said regions. Many powders used for additive fabrication, such as metal and/or ceramic powders, may exhibit low flowability which makes moving particles of the powder difficult due to the tendency of the powder to "clump" rather than flow away from the additively fabricated objects. Similarly, such powders may resist separation when a source of suction is directed onto them. A depowdering system that includes one or more nozzles for directing a stream of gas onto the powder may, however, introduce gaps between particles of the powder sufficient to mitigate or overcome this resistance, leading to more ease in suctioning away the powder.

The de-powdering subsystem 106 may further include a brush or other mechanical agitation device to assist with loosening and/or moving the powder. Alternatively, such brushes may be used in isolation (i.e., without the air jet device) to agitate the unbound powder. The pressurized fluid applicator may comprise one or more jetting profiles. Each jetting profile may comprise a particular spatial characteristic (e.g., a focused, conical air jet, a broad, cylindrical air jet, a fan-shaped air jet, etc.), an/or a time profile (e.g., a particular time sequence of different types of air jet spatial characteristics).

According to some embodiments, one or more nozzles configured to direct a stream of gas onto a powder and one or more sources of suction may be automatically controlled by a suitable robotic system, which may for instance include a gantry, one or more robotic arms, etc. The control subsystem 110 may be configured to send suitable control signals to the robotic system. In some embodiments, individual nozzles or sources of suction, or groups of nozzles and/or sources of suction, may be separately movable to desired locations so that powder may be removed from multiple regions of powder simultaneously.

Figure 7:
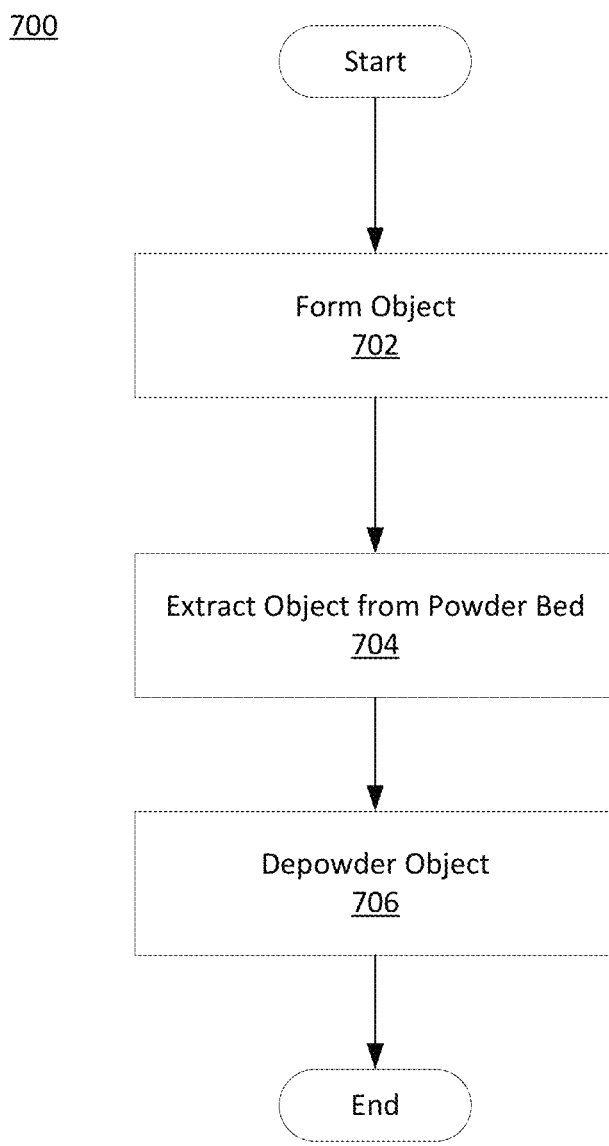
FIG. 7 illustrates a flow chart of an example method of performing additive manufacturing of objects.

FIG. 7 is a diagram of an example of a method or process 700 of additively manufacturing a three-dimensional object in accordance with the teachings of the present disclosure. The method 700 includes forming the object using an additive manufacturing technique performed with one or more powder materials (i.e., a powder-based additive manufacturing technique) (step 702). The additive manufacturing technique involves building the object by adding successive layers of the one or more powder materials on a building platform. The additive manufacturing technique may be performed by any suitable machine or combination of machines. The additive manufacturing technique may, for example, be performed by a computer, three-dimensional modeling software (e.g., Computer Aided Design ("CAD") software), other machine equipment, or combinations thereof. Once a CAD model of the object to be formed is produced or obtained, the machine (or machines) may read in data from the CAD file (of the CAD model) and layer or add successive layers of powder materials in a layer-upon-layer fashion to fabricate the 3D object within a powder bed. It will be appreciated that the powder material used can be one or more suitable materials, such as, for example, ceramics, metal (e.g., stainless steel, aluminum), sand, various alloys, or other materials. It will also be appreciated that the additive manufacturing technique may be any suitable powder-based technique, or combinations thereof.

The method next includes extracting the manufactured object from the powder bed (704). As discussed above, the object may be extracted and moved to a desired location via a robotic arm including an item-engaging tool.

To retrieve the parts or objects from the powder bed, the object extraction subsystem may determine (and/or receive) the coordinates and sizes of each object in the powder bed. The gripper member opening distance and/or position of the gripper member(s) relative to the objects in the powder bed can be determined based on the determined location and/or size of such objects. Knowledge of location and/or size of the object allows the robotic arm to position the item-engaging tool at a precise location (e.g., directly above the object embedded within the powder). Moreover, the object can be extracted without having to rummage for the object within the powder bed. Furthermore, such knowledge also allows for accurate control of the gripper assembly to grab the object and/or differentiation between contact with powder versus contact with the object being extracted.

Location and/or size of objects within the powder bed may be determined using any now or hereafter known methods. For example, sensors such as an imaging sensor (e.g., a camera) included within the system may provide image data relating to the manufacturing of the object(s), which may in turn be analyzed to determine the location and size of each object within the powder bed. Other sensors such as thermal sensors (e.g., by analyzing the thermal temperature of objects), ultrasonic sensors (e.g., by analyzing ultrasonic reflectance of the objects), light detection and ranging (LiDAR) sensors, SONAR sensors, RADAR sensors, etc. may also be used to determine the location and/or size of the objects within the powder bed. In another example, the location may be determined based on the CAD model of the object and the layout of the powder bed. For example, a screenshot or image of the build layout may be obtained, and pixels from the image may be counted. A scaling factor between the pixel size and true dimensions of the object may then be used to determine the precise location and size of each object within the powder bed. In some other examples, the objects may include embedded information (e.g., a barcode, QR code, or other identifier) that is included within the object during the additive manufacturing process and that may be used to determine the location of the object (e.g., using a look-up table that includes object identifiers linked to locations within the powder bed). Optionally, the location and/or size of the objects may be received from a user.

An example schematic of the object extraction process steps is shown in FIG. 8 where the gripper members are accurately positioned over a known location of the object to be extracted and plunged within the surrounding powder and objects (FIG. 8A). Optionally, the gripper assembly may be plunged in the powder bed in a substantially perpendicular (or close to perpendicular) direction from a location directly above the object to be extracted in order to minimize resistance by the powder bed. The gripper members are actuated to grip the object by moving into a gripping position upon determining (e.g., based on pressure sensor data) that they are suitably in contact with the object (FIG. 8B). The object may then be extracted from the powder bed by being lifted upwards (or in another direction) while gripped by the gripper members (FIG. 8C), and moved to a desired post-processing location (FIG. 8D) before being released. Optionally, the gripper assembly may lift the object from the powder bed in a substantially perpendicular (or close to perpendicular) direction to a location directly above the object in order to minimize resistance by the powder bed before moving the object to a desired post-processing location. The object may be released by moving the gripper member(s) to an open or release position from the grip position. Optionally, the object may be moved and/or rotated in front of a jetted air stream for depowdering while being gripped by the gripper member(s), such as before transfer to a post-processing location.

The extracted object may then be depowdered (706) by positioning it with respect the depowdering subsystem. For example, the extracted object may be suitably oriented and/or positioned with respect to the depowdering subsystem (by the robotic arm and gripper assembly) for removal of powder while still being gripped. This allows for positional control of the object with respect to the depowdering subsystem. For example, the object may be positioned in front of an air nozzle and rotated in one or more directions for optimal depowdering via the air jet stream because the air jet can be applied all around the object. Optionally, the depowdering may be performed while the object is being moved from the powder bed to a preprocessing location (e.g., for sintering, etc.). As discussed above, the depowdering may include directing a jet of fluid (e.g., pressurized air) at the object for dislodging and removing the powder.

Figure 9:
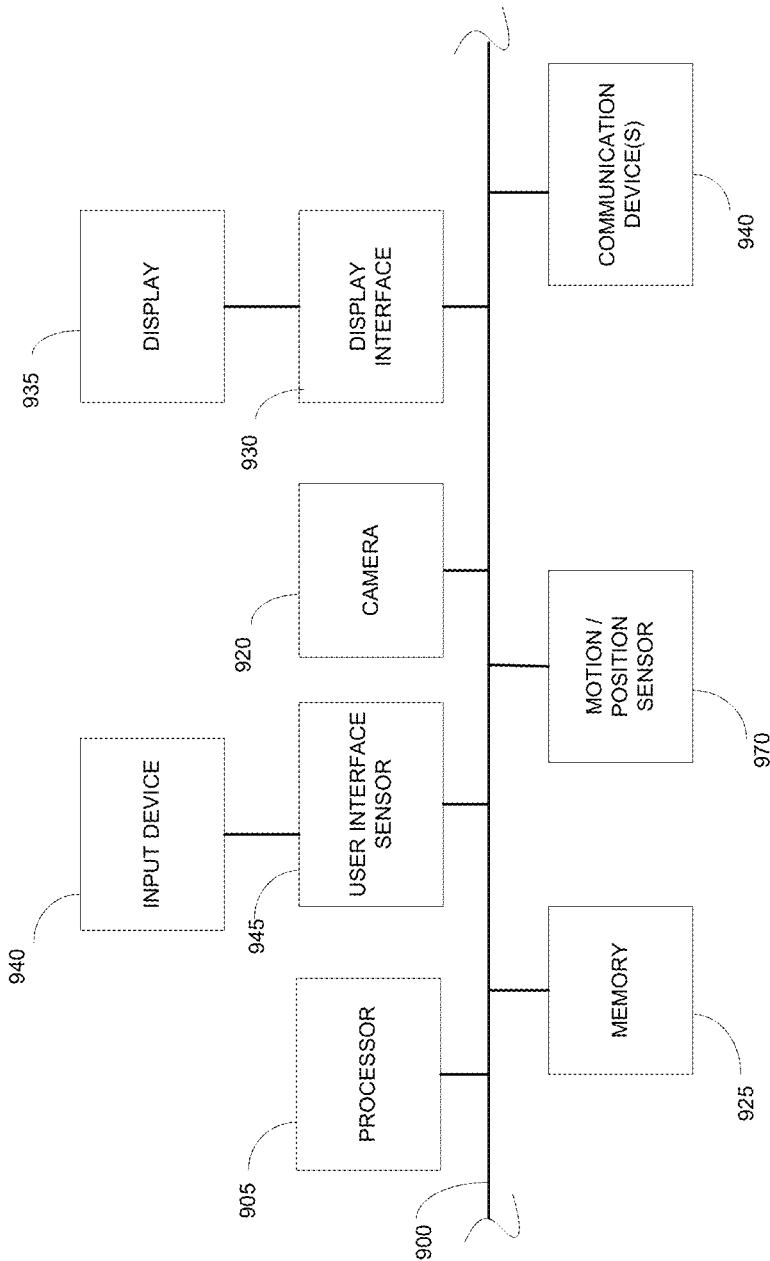
FIG. 9 is a block diagram that illustrates various elements of a possible electronic system, subsystem, controller and/or other component of the system of FIG. 1, and/or external electronic device.

FIG. 9 depicts an example of internal hardware that may be included in additive manufacturing system (100) (including the various subsystems and components thereof) or remote servers. An electrical bus 900 serves as an information highway interconnecting the other illustrated components of the hardware. Processor 905 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 925. A memory device may include a single device or a collection of devices across which data and/or instructions are stored. Various embodiments of the invention may include a computer-readable medium containing programming instructions that are configured to cause one or more processors to perform the functions described in the context of the previous figures.

An optional display interface 930 may permit information from the bus 900 to be displayed on a display device 935 in visual, graphic or alphanumeric format, such as a graphical user interface of a welder. An audio interface and audio output (such as a speaker) also may be provided. Communication with external devices may occur using various communication devices 340 such as a wireless antenna, a radio frequency identification (RFID) tag and/or short-range or near-field communication transceiver, each of which may optionally communicatively connect with other components of the device via one or more communication system. The communication device(s) 940 may be configured to be communicatively connected to a communications network, such as the Internet, a local area network or a cellular telephone data network.

The hardware may also include a user interface sensor 945 that allows for receipt of data from input devices 950 such as a keyboard or keypad, a joystick, a touchscreen, a touch pad, a remote control, a pointing device and/or microphone. Digital image frames also may be received from a camera 920 that can capture video and/or still images. The system also may receive data from a motion and/or position sensor 970 such as an accelerometer, gyroscope or inertial measurement unit.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

An "automated device" or "robotic device" refers to an electronic device that includes a processor, programming instructions, and one or more components that based on commands from the processor can perform at least some operations or tasks with minimal or no human intervention. For example, an automated device may perform one or more automatic functions or function sets. Examples of such operations, functions or tasks may include without, limitation, navigation, transportation, driving, delivering, loading, unloading, and/or the like.

As used herein, the terms "coupled," "coupled to," and "coupled with," each mean a structural and/or electrical connection, whether attached, affixed, connected, joined, fastened, linked, and/or otherwise secured. As used herein, the term "attach" means to affix, couple, connect, join, fasten, link, and/or otherwise secure. As used herein, the term "connect" means to attach, affix, couple, join, fasten, link, and/or otherwise secure.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility" and the like each refer to a non-transitory device on which computer-readable data, programming instructions or both are stored. Except where specifically stated otherwise, the terms "memory," "memory device," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

In this document, when relative terms of order such as "first" and "second" are used to modify a noun, such use is simply intended to distinguish one item from another, and is not intended to require a sequential order unless specifically stated.

In addition, terms of relative position such as "vertical" and "horizontal", or "front" and "rear", when used, are intended to be relative to each other and need not be absolute, and only refer to one possible position of the device associated with those terms depending on the device's orientation.

The invention claimed is:

1. A system for additive manufacturing of objects, the system comprising:
    an object builder subsystem configured to additively manufacture an object in a powder bed;
    an object extraction subsystem configured to extract the object from the powder bed, the object extraction subsystem comprising a gripper assembly comprising two or more gripper members that each include a perforated mesh structure, wherein each of the one or more gripper members comprise one or more sensors that are configured to detect contact between that gripper member and the object and not detect contact between that gripper member and powder particles in the powder bed; and
    a depowdering subsystem configured to remove powder from the object while the object is gripped by the gripper assembly.

2. The system of claim 1, further comprising
a processor; and
a non-transitory computer readable medium comprising one or more programming instructions that, when executed by a processor, will cause the processor to:
 determine a location of the object within the powder bed, and
 transmit the location to the object extraction subsystem.

3. The system of claim 2, wherein the one or more programming instructions that, when executed by a processor, will cause the processor to determine the location of the object comprise instructions to determine the location based on at least one of the following: sensor data, user input, or an object model used for additively manufacture of the object.

4. The system of claim 2, comprising one or more programming instructions that, when executed by a processor, will cause the processor to determine a size of the object.

5. The system of claim 2, wherein the object extraction subsystem further comprises a robotic arm configured to position the gripper assembly over the powder based on the location.

6. The system of claim 1, wherein the perforated mesh structure comprises a plurality of openings that are configured to allow powder from the powder bed to flow therethrough during one or more steps of extracting the object from the powder bed.

7. The system of claim 1, wherein the two or more gripper members are configured to grip the object by moving from an open position to a grip position upon detection of contact with the object.

8. The system of claim 1, wherein the perforated mesh structure comprises a compliant surface that is configured to be compliant in a grip direction of the grip assembly.

9. The system of claim 1, wherein the perforated mesh structure comprises a rigid backbone that is configured to be rigid along a plunge direction, the plunge direction being a direction in which the grip assembly will enter the powder bed for extraction of the object.

10. The system of claim 1, wherein the depowdering subsystem comprises a nozzle configured to direct a fluid stream at the object while gripped by the gripper assembly such that the fluid stream can pass through openings of the perforated mesh structure of the two or more gripper members to remove powder from the object.

11. The system of claim 1, wherein the perforated mesh structure comprises a plurality of openings configured an open-Kagome lattice or a closed-Kagome lattice.

* * * * *